United States Patent
Chambers et al.

(10) Patent No.: US 8,380,191 B2
(45) Date of Patent: *Feb. 19, 2013

(54) TEMPORARY DATA SERVICE IN WIRELESS NETWORKS

(75) Inventors: Michael D. Chambers, Plainfield, IL (US); Cynthia K. Florkey, Chicago, IL (US); Ruth S. Gayde, Naperville, IL (US); Patrick J. Walsh, Naperville, IL (US)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,642

(22) Filed: Nov. 18, 2011

(65) Prior Publication Data

US 2012/0064857 A1    Mar. 15, 2012

Related U.S. Application Data

(63) Continuation of application No. 11/168,140, filed on Jun. 27, 2005, now Pat. No. 8,090,368.

(51) Int. Cl.
*H04W 4/00* (2009.01)
*H04M 11/00* (2006.01)
*H04M 3/42* (2006.01)
*H04M 1/00* (2006.01)
*G06F 15/16* (2006.01)

(52) U.S. Cl. ............. 455/433; 455/406; 455/414.1; 455/550.1; 455/405; 709/219; 709/231

(58) Field of Classification Search .............. 455/433
See application file for complete search history.

(56) References Cited

U.S. PATENT DOCUMENTS 7,130,612 B1 * 10/2006 Blewett et al. .............. 455/406

* cited by examiner

*Primary Examiner* — Patrick Edouard
*Assistant Examiner* — Timothy Pham
(74) *Attorney, Agent, or Firm* — Duft Bornsen & Fishman LLP (57) ABSTRACT

A wireless network and method are disclosed that provide temporary data service to a party. For the invention, a temporary data service system receives a request from a first party to establish temporary data service for a second party. The temporary data service system then configures the wireless network to establish temporary data service for the second party, such as by setting up a temporary subscriber profile or temporary account for the second party in the wireless network. A notification system then generates a notification message indicating that the temporary data service has been established for the second party, and transmits the notification message to the second party. The second party may use the temporary data service to access some type of data message or data file, such as a picture message sent by the first party.

20 Claims, 8 Drawing Sheets

TEMPORARY DATA SERVICE IN WIRELESS NETWORKS

RELATED APPLICATIONS

This non-provisional patent application is a continuation of U.S. patent application Ser. No. 11/168,140 filed on Jun. 27, 2005 now U.S. Pat. No. 8,090,368, which is incorporated herein by reference.

BACKGROUND OF THE INVENTION

1. Field of the Invention

The invention is related to the field of communication networks and, in particular, to wireless networks providing temporary data service. More particularly, the wireless network of the invention provides temporary data service to a party that has a data-capable mobile station but does not subscribe to a data service.

2. Statement of the Problem

Wireless service providers offer many data services to their subscribers, such as multimedia messaging, email, internet access, etc. To receive such services, a user needs to purchase a data-capable device, such as a cell phone, a PDA, a BlackBerry, etc. The user also needs to subscribe to one or more data services offered by the wireless service provider.

Multimedia messaging is one type of upgraded data service subscribed to by many wireless users. Multimedia messaging allows a subscriber to send pictures, video, and voice messages to other wireless phones or email addresses. Multimedia messaging also allows a subscriber to surf the wireless internet and download ringtones, graphics, and games. A multimedia service package is typically billed on a monthly basis based on a charge per message or charge per kilobyte of data transmitted or received.

Picture phones are becoming more popular among wireless users. The phones are capable of taking a digital picture. Without subscribing to a corresponding data service, the digital pictures would remain on the phone and could not be shared with others. By subscribing to the appropriate data service, the subscriber may send picture messages to other subscribers. The picture messages are uploaded to a server in the wireless network or another network, and a link to the picture messages is sent to the recipient(s). The recipients that subscribe to the appropriate data service and have properly equipped phones may then view the picture messages through the link.

If a subscriber sends a message, such as a picture message, to a recipient that either does not have a data-capable wireless phone or has not subscribed to the proper data service, then the recipient will not be able to receive the message. The wireless network may send a text message to the wireless phone indicating an Internet address where the message from the subscriber may be viewed. The recipient would then have to go online with a PC or similar device to view the message. Depending on where the recipient is and his/her technology level, it may be inconvenient or time consuming to access the message online.

The recipient also has the option of signing up for data service in order to view the message. This may mean committing to a year contract, a two year contract, etc, in order to view the message. If this is the only message that the recipient receives during that contract period, it could be a waste of money to view a single message.

Therefore, a problem exists in wireless networks that a sender of a message cannot give a recipient temporary data service so that the recipient may receive and view a message.

SUMMARY OF THE SOLUTION

The invention solves the above and other related problems by providing temporary data service in wireless networks. If the recipient of a message has not subscribed to the appropriate data service to receive the message, then according to the invention, the sender of the message can request a temporary data service for the recipient. The recipient can then view the message, and the sender may be billed for the temporary data service. The invention advantageously allows those who are more technologically advanced to send data messages, such as pictures, video, etc, to recipients who are less technologically advanced or who do not wish to subscribe to data services. A service provider that offers a temporary data service such as this may distinguish itself in a very competitive market.

In one embodiment of the invention, a wireless network is operable to connect a first party to a second party for calls, messages, or another type of communication. The first party is using a first mobile station to communicate with the wireless network. The first mobile station is a device capable of transmitting and receiving data messages or data calls in addition to voice calls. The second party is using a second mobile station to communicate with the wireless network. The second mobile station is a device capable of transmitting and receiving data messages or data calls in addition to voice calls.

The first party has subscribed to a data service offered by a service provider using the wireless network. However, the second party has not subscribed to an appropriate data service to receive data messages from the first party. If the first party wants to transmit a data message to the second party, then the first party may request temporary data service for the second party through the wireless network as follows.

The wireless network includes a temporary data service system and a notification system. The temporary data service system receives a request from the first party to provide temporary data service to the second party that is using the second mobile station. The temporary data service system then configures the wireless network to establish temporary data service for the second party. To configure the wireless network for the temporary data service, the temporary data service system may communicate with one or more other systems or servers in the wireless network to set up a temporary subscriber profile or temporary account for the second party. The notification system generates a notification message indicating that the temporary data service has been established for the second party. The notification system transmits the notification message to the second mobile station of the second party. The notification message may be any message receivable by the second mobile station, such as a voice message, a text message (e.g., an SMS message), or some other type of message.

After receiving notification of the temporary data service, the second party may use the temporary data service to access a data message or data file. For instance, if the first party has transmitted a picture message to the second party, then the second party may use the temporary data service to receive and view the picture message. Charges for the temporary data service may be billed to the first party, depending on desired implementations. After utilizing the temporary data service or after a time period, the temporary data service is deactivated by the wireless network.

The invention may include other exemplary embodiments described below.

DESCRIPTION OF THE DRAWINGS

The same reference number represents the same element on all drawings.

DETAILED DESCRIPTION OF THE INVENTION

FIGS. 1-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
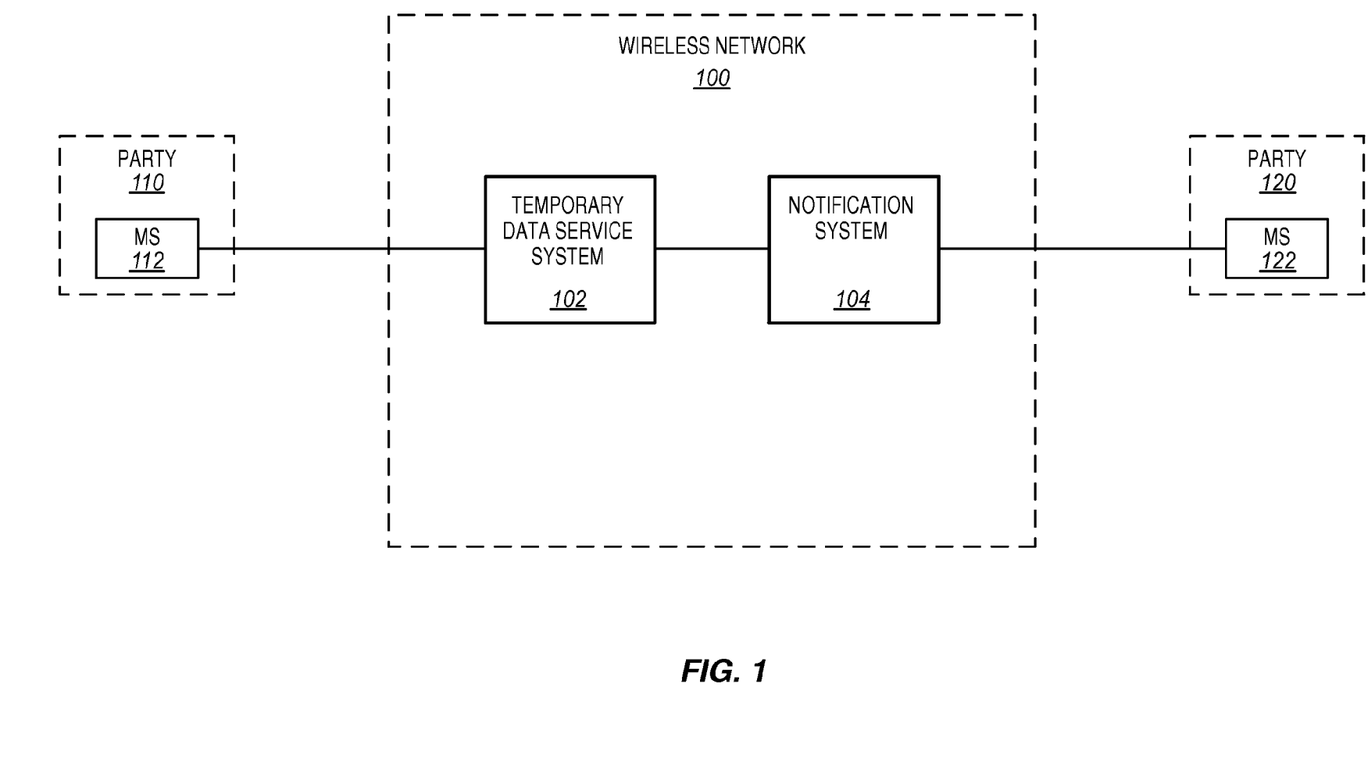
FIG. 1 illustrates a wireless network in an exemplary embodiment of the invention.

FIG. 1 illustrates a wireless network 100 in an exemplary embodiment of the invention. Wireless network 100 is operable to connect a first party 110 to a second party 120 for calls, messages, or another type of communication. In this embodiment, first party 110 is using a first mobile station (MS) 112 to communicate with wireless network 100. Mobile station 112 is a device capable of transmitting and receiving data messages or data calls in addition to voice calls. Party 110 may alternatively communicate with the wireless network 100 with another type of device, such as a data-capable landline phone, a PC, etc. Second party 120 is using a second mobile station (MS) 122 to communicate with wireless network 100. Mobile station 122 is a device capable of transmitting and receiving data messages or data calls in addition to voice calls. Wireless network 100 includes a temporary data service system 102 and a notification system 104. Wireless network 100 may include other networks, systems, or devices not shown in FIG. 1.

Temporary data service system 102 comprises any system, server, or application that is operable to configure wireless network 100 to establish temporary data service for party 120. Temporary data service system 102 may configure wireless network 100 by communicating with one or more other systems or servers in wireless network 100 that are not shown for the sake of brevity. Depending on the make-up of the wireless network 100, temporary data service system 102 may communicate with many different systems or servers to establish the temporary data service, such as an Authentication, Authorization and Accounting (AAA) system, a Home Location Register (HLR), a Mobile Switching Center (MSC), etc. One example of temporary data service system 102 is an Application Server (AS) (not shown) within wireless network 100.

Notification system 104 comprises any system, server, or application that is operable to generate a notification message and transmit the notification message to mobile station 122 of party 120. The notification message may take on many different desired forms. One example of notification system 104 is a Short Message Service Center (SMS-C) operable to transmit a text message to party 120.

In this embodiment, party 110 has subscribed to a data service offered by a service provider (not shown) using wireless network 100. Examples of service providers are Cingular, Verizon, and Sprint. However, party 120 has not subscribed to an appropriate data service offered by the service provider. When it is said that party 120 has not subscribed to an appropriate data service, it means that party 120 has not subscribed to the appropriate data service to receive a data message from party 110 over wireless network 100. Party 120 may subscribe to one or more data services, but not the appropriate service to receive the data message from party 110. As an example, party 120 may subscribe to a text messaging service, but does not subscribe to a picture messaging service. Therefore, party 120 would not be able to receive a picture message from party 110.

Either temporary data service system 102 or notification system 104 may comprise instructions executable by a processing system (not shown). Some examples of instructions are software, program code, and firmware. The instructions are operational when executed by the processing system to direct the processing system to operate in accord with the invention. The term "processing system" refers to a single processing device or a group of inter-operational processing devices. Some examples of processors are computers, integrated circuits, and logic circuitry. Temporary data service system 102 and notification system 104 may be operating on the same platform in wireless network 100, or may be remote from one another in wireless network 100.

Figure 2:
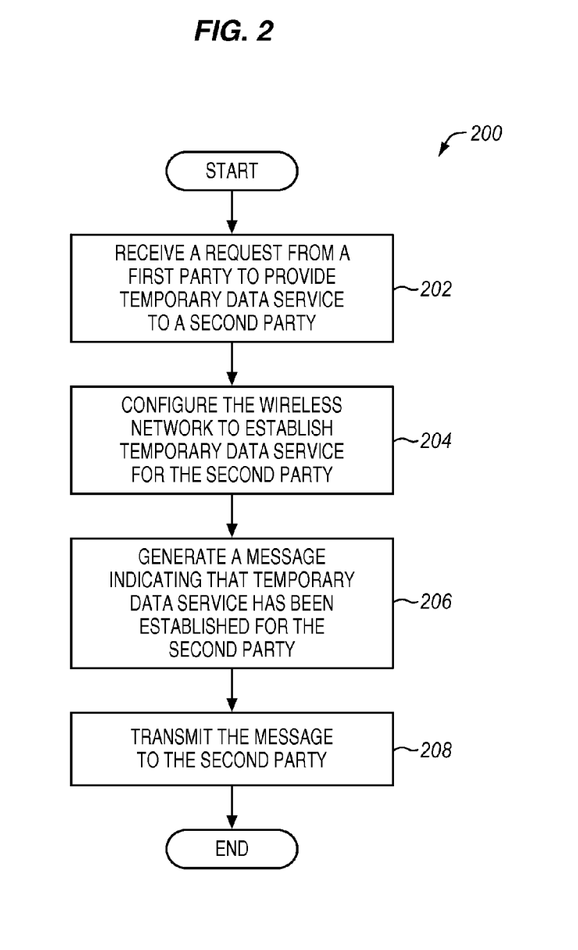
FIG. 2 is a flow chart illustrating a method of operating the wireless network of FIG. 1 in an exemplary embodiment of the invention.

FIG. 2 is a flow chart illustrating a method 200 of operating wireless network 100 in an exemplary embodiment of the invention. The steps of the flow chart in FIG. 2 are not all inclusive and may include other steps not shown.

In step 202 of method 200, temporary data service system 102 receives a request from party 110 to provide temporary data service to party 120 that is using mobile station 122. Temporary data service system 102 may receive the request because party 110 wants to send a data message, such as a picture message, a video clip, etc, to party 120, and party 120 does not subscribe to the appropriate data service to receive the data message from party 110. Party 110 may have previously attempted to send the data message and received a response from wireless network 100 indicating that party 120 is not allowed to receive the data message. Party 110 may also know that party 120 is not allowed to receive the data message.

In step 204, temporary data service system 102 configures the wireless network 100 to establish temporary data service for party 120. To configure the wireless network 100 for the temporary data service, temporary data service system 102 may communicate with one or more other systems or servers in wireless network 100 (not shown in FIG. 1) to set up a temporary subscriber profile or temporary account for party 120. As an example, temporary data service system 102 may request an Authentication, Authorization and Accounting (AAA) system (not shown) to establish a temporary subscriber profile for party 120. Temporary data service system 102 may additionally or alternatively request that the HLR (not shown) for party 120 add temporary data service to the subscriber profile for party 120.

In step 206, notification system 104 generates a notification message indicating that temporary data service has been established for party 120. The notification message may take on many desired forms to notify party 120 that the temporary data service has been established. For instance, the notification message may explicitly indicate that temporary data service has been established. Alternatively, the notification message may indicate that a picture message or other data message is available to party 120. Alternatively, the notification message may provide a link to a data message to party 120. In any of these cases, the notification message indicates that temporary data service is established, even if party 120 does not know what data service is.

In step 208, notification system 104 transmits the notification message to the mobile station 122 of party 120. The notification message may be any message receivable by mobile station 122. For instance, the notification message may comprise a voice message, a text message (e.g., an SMS message), or some other type of message.

After receiving notification of the temporary data service, party 120 may use the temporary data service to access a data message or data file. For instance, if party 110 has transmitted a picture message to party 120, then party 120 may use the temporary data service to receive and view the picture message.

After utilizing the temporary data service, after a time period, or after some other trigger, the temporary data service is deactivated. The trigger for deactivation may be any desired event. For instance, the temporary data service may be for a time period, such as three hours, after which it is deactivated. The temporary data service may alternatively be for a number of messages, such as two picture messages. The temporary data service may alternatively be for a number of bytes, such as two megabytes.

Wireless network 100 may then bill party 110 for the temporary data service provided to party 120. If party 110 and party 120 have wireless service through different service providers, the service providers can resolve the billing issues in a conventional manner. If either of party 110 or party 120 subscribes to additional service, features, or functions through a third party, further billing may be resolved with the third party.

Wireless network 100 as described in FIGS. 1-2 advantageously provides a mechanism where party 110 may request temporary data service for party 120. Party 110 thus has the ability to send data messages to party 120 even if party 120 does not subscribe to the appropriate data service. Party 120 has the advantage of being able to receive temporary data service that is paid for by party 110.

Figure 3:
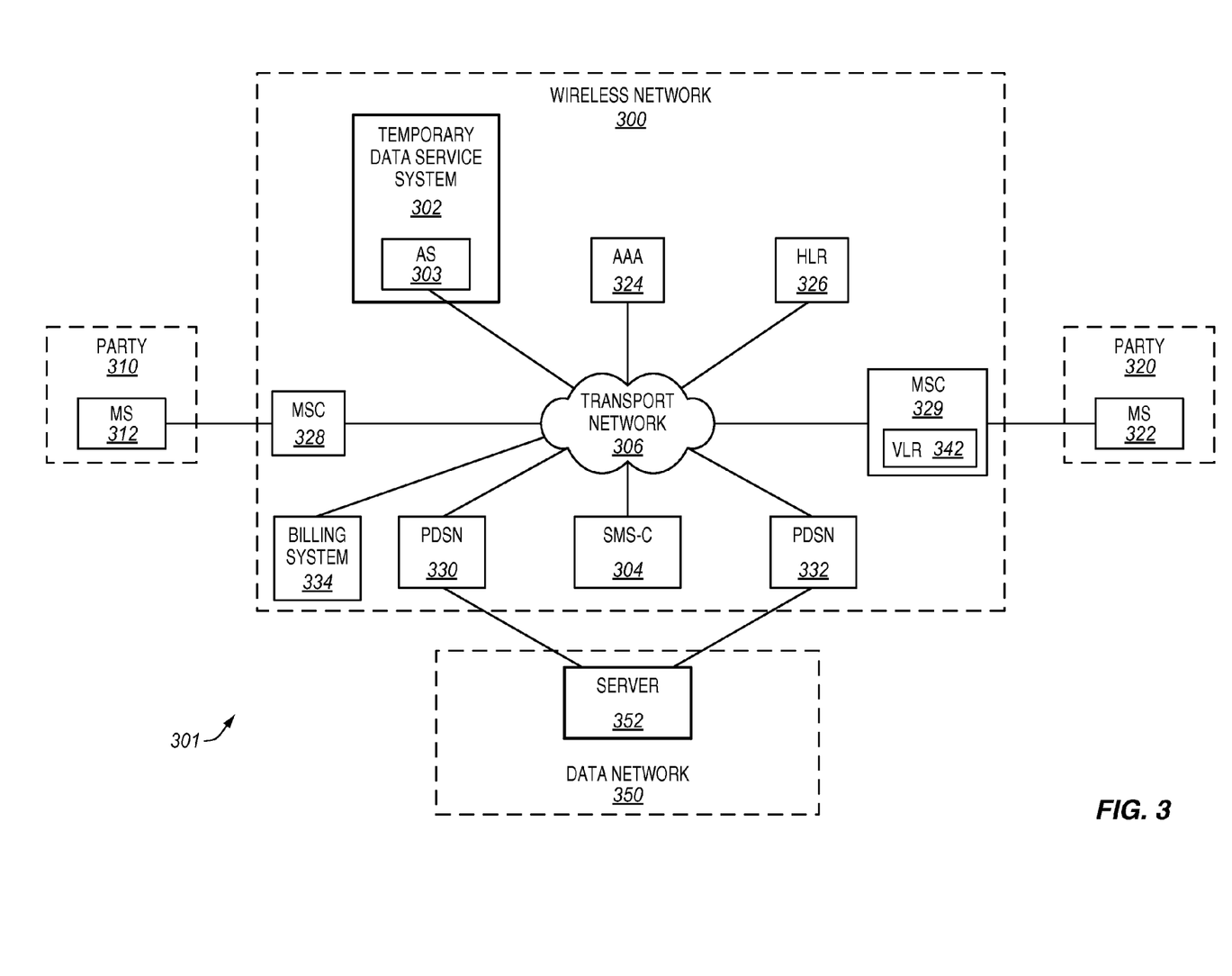
FIG. 3 illustrates a communication network in another exemplary embodiment of the invention.

FIG. 3 illustrates a communication network 301 in another exemplary embodiment of the invention. FIG. 3 illustrates one embodiment and the invention is not limited to this embodiment. Communication network 301 includes a wireless network 300 and a data network 350. Wireless network 300 is operable to connect a first party 310 to a second party 320 for calls, messages, or another type of communication. In this embodiment, first party 310 is using a first mobile station (MS) 312 to communicate with wireless network 300. Mobile station 312 is a device capable of transmitting and receiving data messages or data calls in addition to voice calls. Second party 320 is using a second mobile station (MS) 322 to communicate with wireless network 300. Mobile station 322 is a device capable of transmitting and receiving data messages or data calls in addition to voice calls.

Wireless network 300 includes a temporary data service system 302 that comprises an Application Server (AS) 303 in this embodiment. Wireless network 300 also includes a Short Message Service Center (SMS-C) 304 that represents a notification system, such as the notification system 104 shown in FIG. 1. Wireless network 300 also includes an Authentication, Authorization and Accounting (AAA) system 324, a Home Location Register (HLR) 326 for party 320, a Mobile Switching Center (MSC) 329 for serving party 320, an MSC 328 for serving party 310, a Packet Data Serving Node (PDSN) 330, a PDSN 332, and billing system 334. Each of these systems is operable to communicate with one another over a transport network 306. Wireless network 300 may include other networks, systems, or devices not shown in FIG. 3.

Data network 350 includes one or more servers 352 for storing data files or data messages, such as picture messages, video clips, etc. Server 352 and its associated data messages have Uniform Resource Locators (URLs) so that devices may access server 352 and the data messages. Data network 350 may comprise a packet data network that is external to wireless network 300. One example of data network 350 comprises the public internet.

Assume that MS 312 is a picture phone and that party 310 wants to use MS 312 to take one or more digital pictures, and send the digital pictures to party 320. Further assume that MS 322 is also a picture phone, but that party 320 has not subscribed to the proper data service to receive picture messages from party 310. According to the invention, even though party 320 has not subscribed to the proper service, wireless network 300 may provide temporary data service to party 320 so that party 320 can receive picture messages from party 310. Although picture messages are described in this embodiment, this embodiment applies equally to any type of data message or data file.

Figure 4:
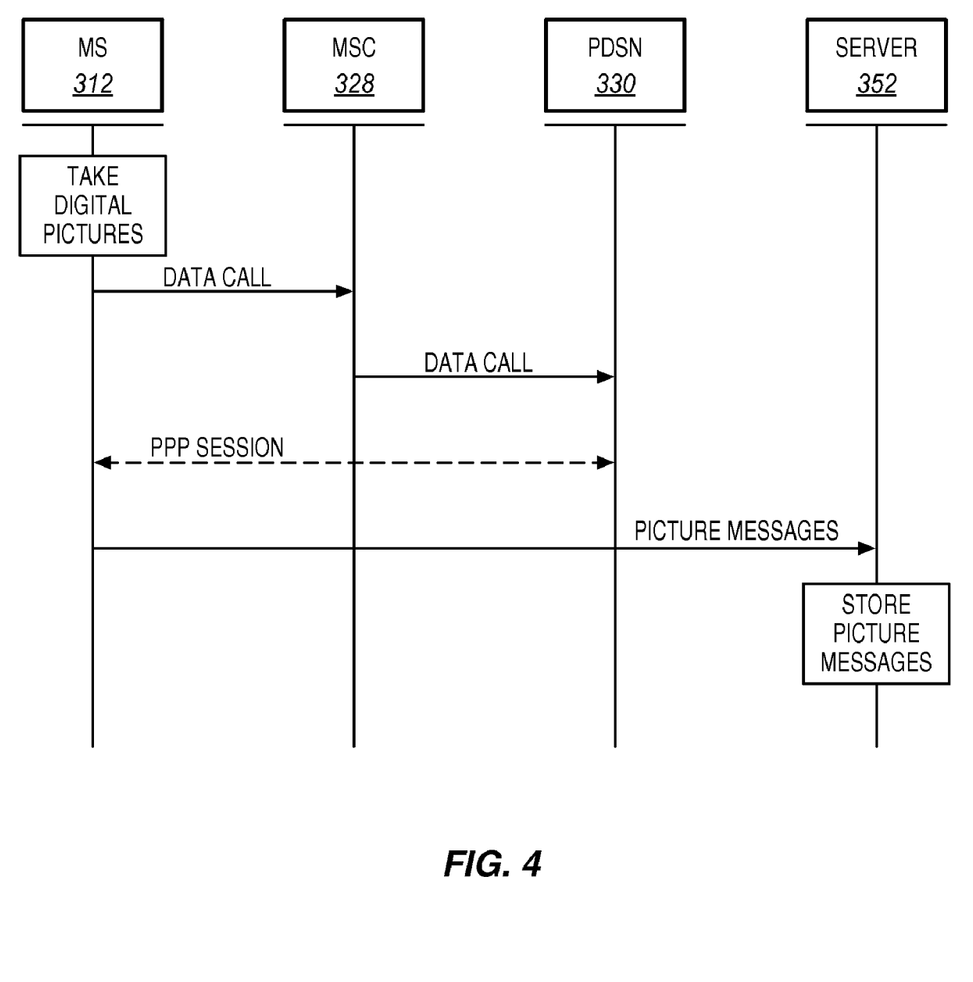
FIG. 4 is a signaling diagram illustrating a party uploading picture messages to a data network in an exemplary embodiment of the invention.

To send the picture messages to party 320, party 310 first needs to upload the picture messages to data network 350. FIG. 4 is a signaling diagram illustrating party 310 uploading picture messages to data network 350 in an exemplary embodiment of the invention. Party 310 first uses MS 312 to take one or more digital pictures. Using the data service subscribed to by party 310, party 310 enters the appropriate instructions in MS 312. Following the instructions from party 310, MS 312 initiates a data call to upload the picture messages to data network 350. MSC 328 receives the data call and selects a PDSN to allow MS 312 to access server 352. In this embodiment, MSC 328 selects PDSN 330. MSC 328 then routes the data call to PDSN 330.

PDSN 330 then establishes a Point to Point Protocol (PPP) session with MS 312, if not already established. Once the PPP session is established data transfer may occur. MS 312 can then transmit the picture messages to server 352, and server 352 stores the picture messages.

As an alternative, party 310 may take the digital pictures with MS 312. Party 310 may then download the digital pictures to a PC (not shown). Party 310 may then upload the digital pictures to server 352 using the PC.

Figure 5:
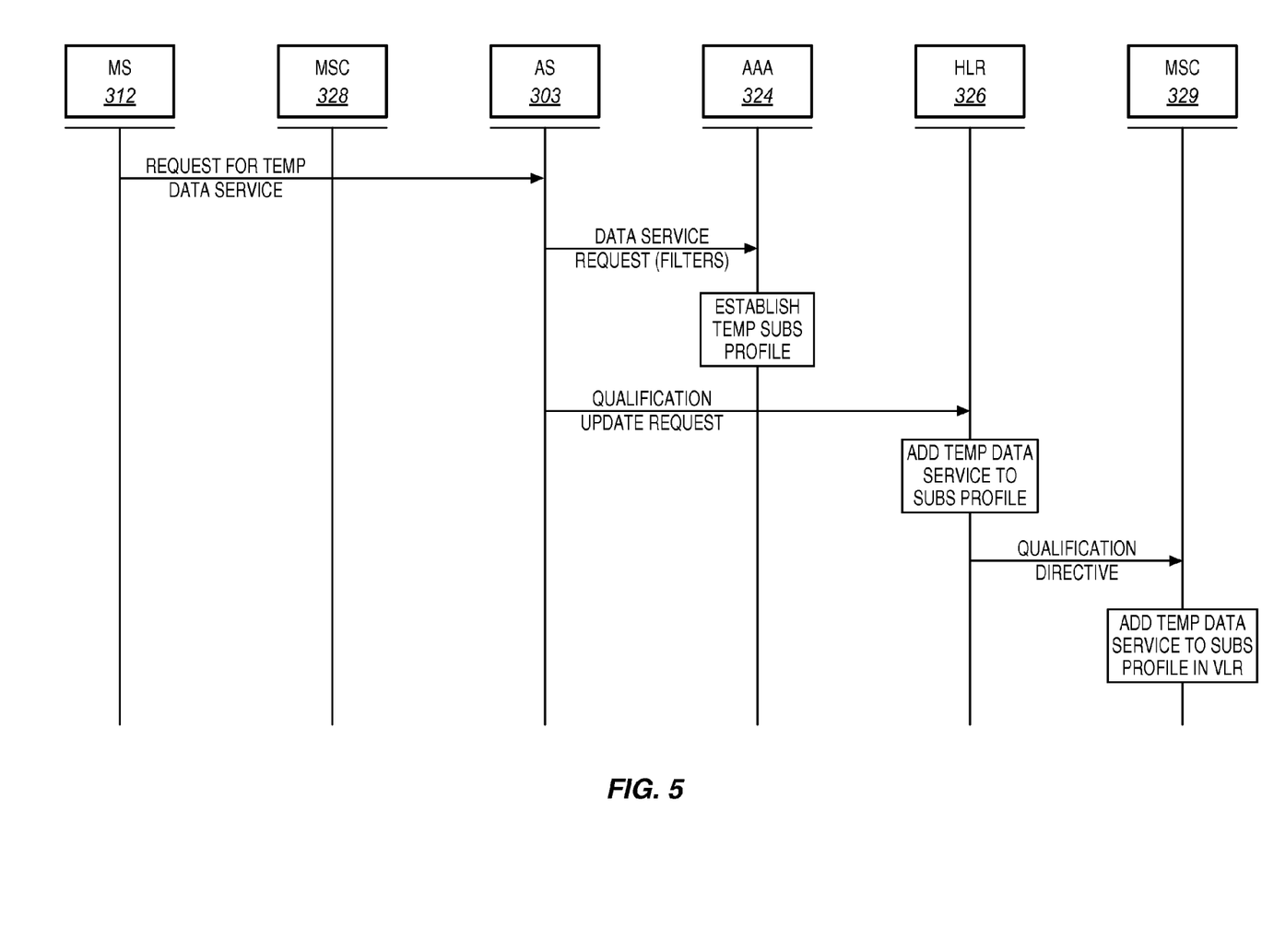
FIG. 5 is a signaling diagram illustrating the activation of the temporary data service in an exemplary embodiment of the invention.

After the picture messages are uploaded, party 310 needs to access the service from the service provider that provides temporary data service to party 320. Party 310 may have previously attempted to send the picture messages to party 320, and received a response from wireless network 300 indicating that party 320 is not allowed to receive the picture messages. Party 310 may also know a priori that party 320 is not allowed to receive the picture messages. The temporary data service, that may be termed "Pay as you Send" or something similar, is performed by AS 303 in this embodiment. FIG. 5 is a signaling diagram illustrating the activation of temporary data service in an exemplary embodiment of the invention. To initiate the temporary data service, party 310 instructs MS 312 to transmit a request for temporary data service to AS 303. The instruction may be a selection in a menu displayed by MS 312, may be a special code, etc. The request for temporary data service may include a mobile station directory number of party 320.

Responsive to the request for temporary data service from party 320, AS 303 configures the wireless network 300 to establish temporary data service for party 320. To configure the wireless network 300, AS 303 transmits a data service request for a temporary subscriber profile for party 320 to AAA 324. The request includes the appropriate filters to restrict access provided by the temporary data service. For instance, a filter may restrict the access of party 320 to the picture messages stored in server 352, and access to other destinations or messages is prohibited. A filter may allow party 320 to only receive and view one, two, three, or some other number of messages. A filter may allow party 320 to have the temporary data service for a time period, such as thirty minutes, one hour, two hours, etc. A filter may restrict access to a particular number of bytes of data. Responsive to the request for temporary data service, AAA 324 establishes a temporary subscriber profile for party 320 to receive data service.

AS 303 also transmits a qualification update request to HLR 326 to add temporary data service to the subscriber profile for party 320. Responsive to the qualification update request, HLR 326 adds temporary data service to the subscriber profile for party 320. HLR 326 already has a subscriber profile established for party 320. However, the subscriber profile has a flag or another indication that party 320 has not subscribed to the appropriate data service. Therefore, HLR 326 changes this flag to temporarily indicate that party 320 is a data subscriber.

HLR 326 then transmits a qualification directive to MSC 329 that is serving MS 322. The qualification directive is a request to add temporary data service to the subscriber profile for party 320. Responsive to the directive, MSC 329 updates the subscriber profile for party 320 in a Visitor Location Register (VLR) 342 to temporarily indicate that party 320 is a data subscriber.

At this point, party 320 is authorized for temporary data service in wireless network 300. With temporary data service established, the wireless network 300 needs to notify party 320 that he/she has the temporary data access.

Figure 6:
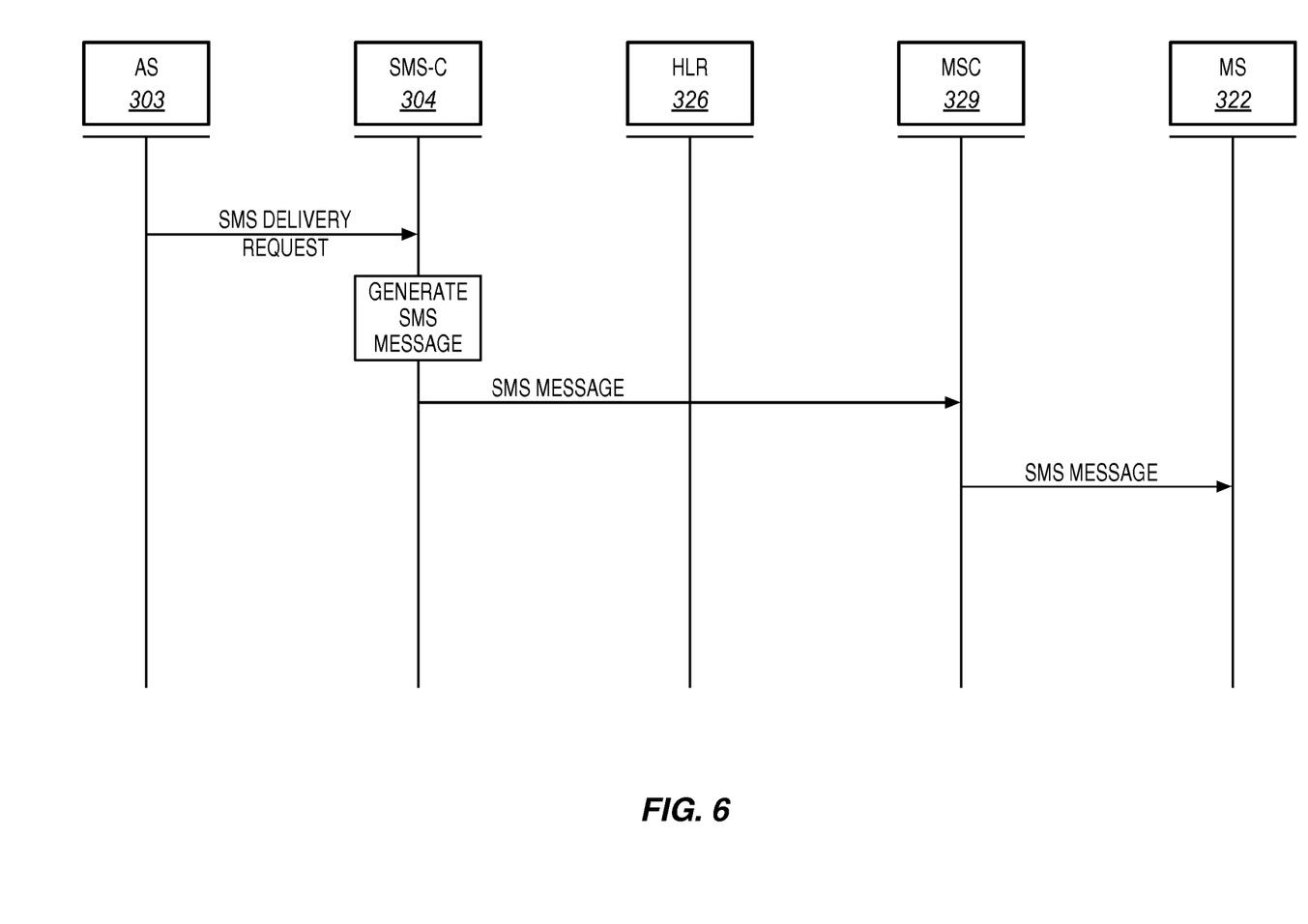
FIG. 6 is a signaling diagram illustrating notification of the temporary data service in an exemplary embodiment of the invention.

FIG. 6 is a signaling diagram illustrating notification of the temporary data service in an exemplary embodiment of the invention. For notification, AS 303 transmits an SMS delivery request to SMS-C 304 with the Mobile Identification Number (MIN) or International Mobile Subscriber Identity (IMSI) of MS 322. The SMS delivery request may also include the content for the message. The content for the message is intended to inform party 320 that temporary data service has been established for party 320 so that party 320 may view the picture messages sent by party 310. SMS-C 304 generates an SMS message based on the received content, and transmits the SMS message to MSC 329. MSC 329 then transmits the SMS message to MS 322. MSC 329 may use Mobile Terminate (MT) SMS procedures to deliver the SMS message to MS 322. SMS-C 304 may have to query HLR 326 for the location MS 322. The SMS message may include a notification, such as "Free Picture Waiting". The SMS message may also include a link to the picture messages being stored in server 352 (see FIG. 3).

If party 320 has not subscribed to an SMS message service, then wireless network 300 may include temporary SMS service with the temporary data service provided to party 320.

Figure 7:
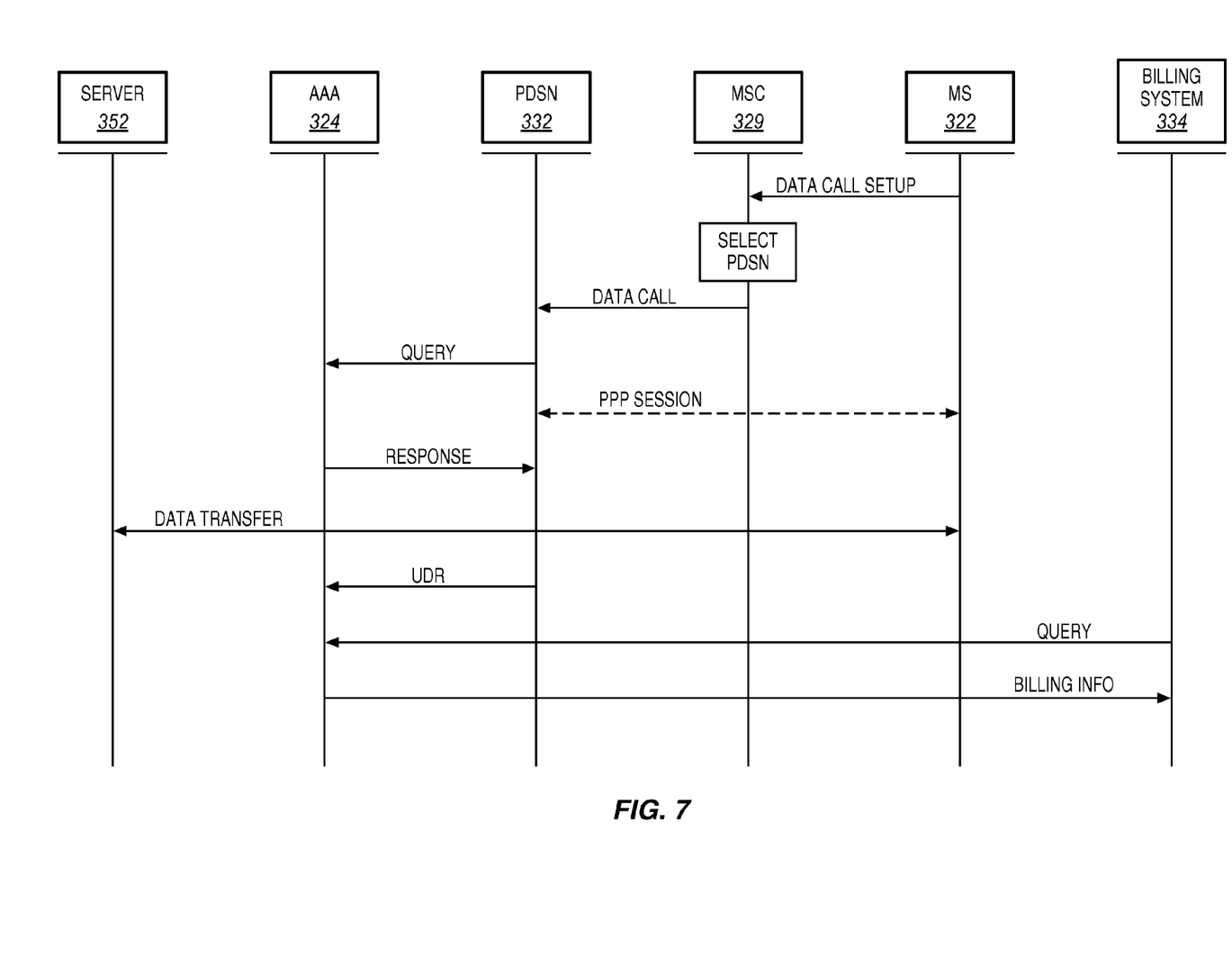
FIG. 7 is a signaling diagram illustrating a party using the temporary data service in an exemplary embodiment of the invention.

After receiving notification of the temporary data service, party 320 may then use the temporary data service to access the picture messages sent by party 310. FIG. 7 is a signaling diagram illustrating party 320 using the temporary data service in an exemplary embodiment of the invention. Responsive to instructions from party 320, MS 322 initiates a data call to receive and view the picture messages. MSC 329 receives the data call and selects a PDSN to allow MS 322 to access server 352. MSC 329 also checks the VLR to determine if data service is authorized for party 320. In this embodiment, MSC 329 selects PDSN 332. MSC 329 then routes the data call to PDSN 332.

PDSN 332 then queries AAA 324 to determine if party 320 has subscribed to the appropriate data service. AAA 324 will determine that party 320 has subscribed to the appropriate data service because of the temporary subscriber profile that was established in AAA 324. AAA 324 will also process the filters defined for the temporary data service to ensure that the temporary data service has not expired. If the temporary data service has not expired, then AAA 324 will respond to PDSN 332 indicating that party 320 is authorized for the data service.

PDSN 332 then establishes a Point to Point Protocol (PPP) session with MS 322. PDSN 332 connects the data call between MS 322 and server 352. MS 322 can then view the picture messages uploaded by party 310.

Periodically, PDSN 332 transmits Usage Data Records (UDRs) to AAA 324 indicating a number of bytes used, a time of the session, etc. Also, billing system 334 periodically transmits queries to AAA 324 for billing information. AAA 324 responds to billing system 334 with the billing information. For the invention, billing system 334 may bill either party 310 or party 320 for the temporary data service. In this embodiment, billing system 334 bills party 310 for the temporary data service, as party 310 is the one requesting the temporary data service. If party 310 and party 320 subscribe to different service providers, billing system 334 may reconcile the bills in a conventional manner.

Figure 8:
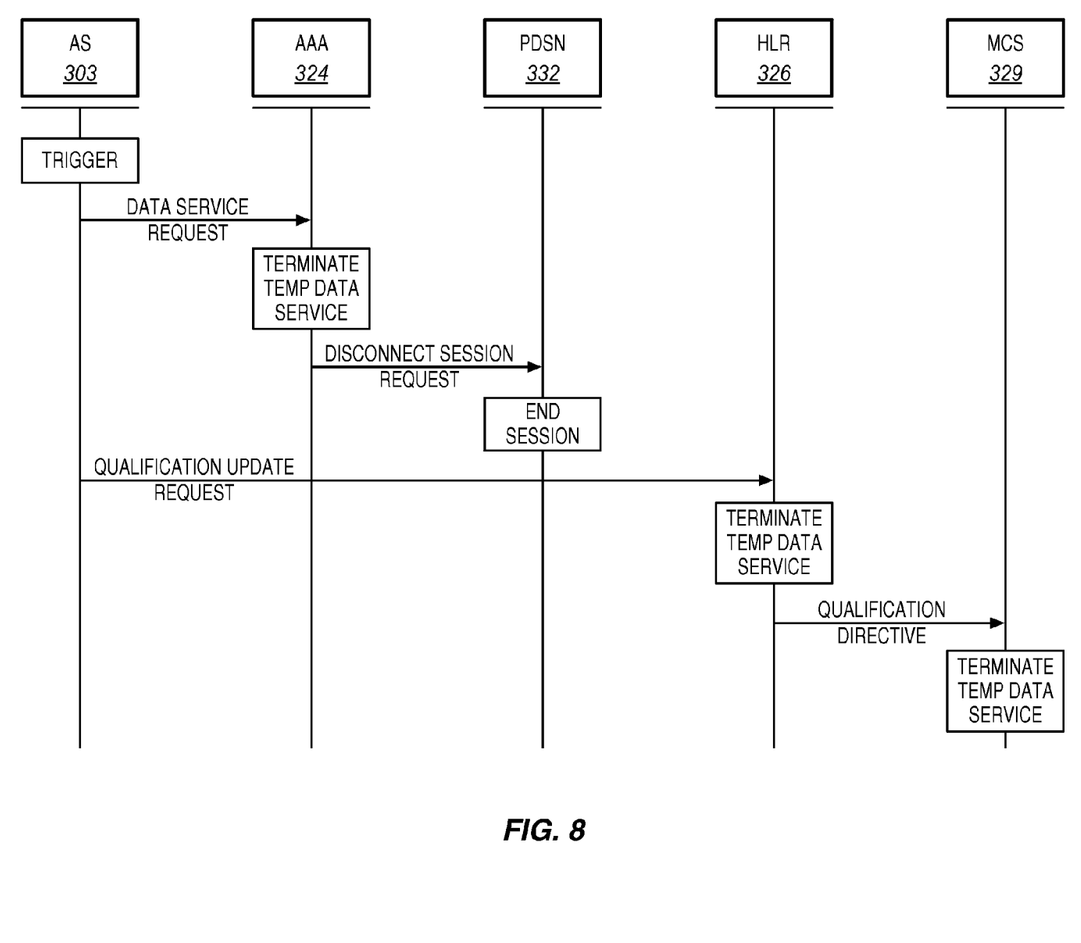
FIG. 8 is a signaling diagram illustrating the deactivation of the temporary data service in an exemplary embodiment of the invention.

FIG. 8 is a signaling diagram illustrating deactivation of the temporary data service in an exemplary embodiment of the invention. An external or internal trigger may terminate the temporary data service. The trigger may be based on a pre-set data service expiration time, a de-authorization request from party 310, input from a technician, etc. AS 303 transmits a data service request to AAA 324 to end the temporary subscriber profile for party 320. Responsive to the request, AAA 324 deletes the temporary subscriber profile for party 320. AAA 324 transmits a disconnect session request to PDSN 332. Responsive to the request, PDSN 332 disconnects the PPP session with MS 322.

AS 303 transmits a qualification update request to HLR 326 to delete the temporary data service from the subscriber profile for party 320. Responsive to the request, HLR 326 updates the subscriber profile for party 320 to terminate the temporary data service. HLR 326 may change a flag or some other indication to return the subscriber profile to its original condition. HLR 326 transmits a qualification directive to MSC 329 that is serving MS 322. The qualification directive is a request to delete the temporary data service from the subscriber profile for party 320. Responsive to the directive, MSC 329 updates the subscriber profile for party 320 in the VLR 342 to terminate the temporary data service.

Although specific embodiments were described herein, the scope of the invention is not limited to those specific embodiments. The scope of the invention is defined by the following claims and any equivalents thereof.

We claim:

1. A system comprising:
   a temporary data service system operable to receive a request from a first party to provide a temporary data service to a second party over a wireless network, wherein the second party does not subscribe to an appropriate data service to receive a data message from the first party over the wireless network;
   the temporary data service system is further operable to configure the wireless network to establish the temporary data service for the second party to allow the second party to receive the data message from the first party over the wireless network.

2. The system of claim 1 wherein:
   the temporary data service system is further operable to deactivate the temporary data service for the second party after a time period.

3. The system of claim 1 wherein:
   the temporary data service system is further operable to deactivate the temporary data service after the second party receives the data message.

4. The system of claim 1 wherein:
   the temporary data service system is further operable to deactivate the temporary data service after the second party has received a particular number of bytes of data.

5. The system of claim 1 further comprising:
   a notification system operable to provide a notification to the second party indicating that the temporary data service is established.

6. The system of claim 5 wherein:
   the notification system is further operable to provide a link to the data message in the notification that is provided to the second party.

7. The system of claim 5 wherein:
   the notification system comprises a message center operable to transmit a text message to the second party indicating that the temporary data service is established.

8. The system of claim 1 wherein:
   the temporary data service system is further operable to charge the first party for the temporary data service provided to the second party.

9. The system of claim 1 wherein:
   the temporary data service system is further operable to set up a temporary subscriber profile for the second party in an Authentication, Authorization and Accounting (AAA) server in order to establish the temporary data service for the second party.

10. The system of claim 1 wherein:
    the temporary data service system is further operable to add the temporary data service to a subscriber profile for the second party in a subscriber database in order to establish the temporary data service for the second party.

11. A method comprising:
    receiving a request from a first party to provide a temporary data service to a second party over a wireless network, wherein the second party does not subscribe to an appropriate data service to receive a data message from the first party over the wireless network; and
    configuring the wireless network to establish the temporary data service for the second party to allow the second party to receive the data message from the first party over the wireless network.

12. The method of claim 11 further comprising:
    deactivating the temporary data service for the second party after a time period.

13. The method of claim 11 further comprising:
    deactivating the temporary data service after the second party receives the data message.

14. The method of claim 11 further comprising:
    deactivating the temporary data service after the second party has received a particular number of bytes of data.

15. The method of claim 11 further comprising:
    providing a notification to the second party indicating that the temporary data service is established.

16. The method of claim 15 further comprising:
    providing a link to the data message in the notification that is provided to the second party.

17. The method of claim 15 wherein providing a notification to the second party comprises:
    sending a text message to the second party indicating that the temporary data service is established.

18. The method of claim 11 further comprising:
    charging the first party for the temporary data service provided to the second party.

19. The method of claim 11 wherein configuring the wireless network to establish the temporary data service comprises:
    setting up a temporary subscriber profile for the second party in an Authentication, Authorization and Accounting (AAA) server in order to establish the temporary data service for the second party.

20. The method of claim 11 wherein configuring the wireless network to establish the temporary data service comprises:
    adding the temporary data service to a subscriber profile for the second party in subscriber database in order to establish the temporary data service for the second party.

* * * * *